(12) United States Patent
You et al.

(10) Patent No.: US 9,550,526 B2
(45) Date of Patent: Jan. 24, 2017

(54) LANE KEEPING CONTROL SYSTEM AND METHOD

(71) Applicant: Hyundai Mobis Co., Ltd, Seoul (KR)

(72) Inventors: Eun Young You, Yongin (KR); Kwang Keun Joseph Shin, Yongin (KR)

(73) Assignee: Hyundai Mobis Co., Ltd., Seoul (KR)

( * ) Notice: Subject to any disclaimer, the term of this patent is extended or adjusted under 35 U.S.C. 154(b) by 78 days.

(21) Appl. No.: 13/656,299

(22) Filed: Oct. 19, 2012

(65) Prior Publication Data
US 2014/0067205 A1 Mar. 6, 2014

(30) Foreign Application Priority Data
Sep. 3, 2012 (KR) .................. 10-2012-0097292

(51) Int. Cl.
*B60W 30/12* (2006.01)
*B62D 15/02* (2006.01)

(52) U.S. Cl.
CPC ............. *B62D 15/025* (2013.01); *B60W 30/12* (2013.01); *B60W 2520/10* (2013.01); *B60W 2550/146* (2013.01); *B60W 2710/207* (2013.01)

(58) Field of Classification Search
CPC ..... B62D 15/025; B62D 15/02; B62D 15/021; B60W 30/12; B60W 10/20; B60W 40/114; B60W 40/072; B60W 40/105; B60W 2520/10; B60W 2550/146; B60W 2710/207; G05D 1/021; G05D 1/0212
USPC ...................................... 701/41, 42; 340/436
See application file for complete search history.

(56) References Cited

U.S. PATENT DOCUMENTS 5,350,912 A * 9/1994 Ishida ........................... 250/202
6,311,123 B1 * 10/2001 Nakamura et al. ............. 701/96

FOREIGN PATENT DOCUMENTS

| JP | 2010-044461 A | 2/2010 |
| KR | 2003-0071520 A | 9/2003 |
| KR | 10-2011-0032707 A | 3/2011 |
| KR | 10-2011-0054144 A | 5/2011 |

(Continued)

OTHER PUBLICATIONS

Machine Translation of Korean Patent Publication KR 10-2011-032707—Soon Tae Kim (Mando Corporation), Method and System for Assisting Lane Keeping, Mar. 30, 2011, Korean Patent Office.*

(Continued)

*Primary Examiner* — John Q Nguyen
*Assistant Examiner* — Nadeem Odeh
(74) *Attorney, Agent, or Firm* — NSIP Law

(57) ABSTRACT

Disclosed is a lane keeping control system, including: a target distance calculator configured to calculate a target distance by receiving a speed of a vehicle; and a target trace generator configured to generate coordinates of a target point separated by the target distance by receiving vehicle information and camera image information and generate a target trace to the target point as a circular trace. Accordingly, by variably calculating a target distance according to a speed of a vehicle, generating a target trace of a vehicle according to the target distance as a profile (curvature) in a form of a circular trace, and applying the generated profile (curvature) to a lane keeping control, smooth lane keeping control may be achieved and a sense of steering difference of a driver may be minimized.

14 Claims, 6 Drawing Sheets

(56) References Cited

FOREIGN PATENT DOCUMENTS

| KR | 10-2011-0062440 A | 6/2011 |
| KR | 10-2011-0104681 A | 9/2011 |
| KR | 10-2011-0104682 A | 9/2011 |
| KR | 10-2012-0089498 A | 8/2012 |
| WO | WO 2011/110156 A2 | 9/2011 |

OTHER PUBLICATIONS

Snider, Automatic Steering Methods for Autonomous Automobile Path Tracking, Feb. 2009, Robotics Institute, Carnegie Mellon University.*
Extended European Search Report mailed Oct. 16, 2013 in counterpart European Application No. 12189017.2 (8 pages, in English).
Korean Office Action issued Oct. 16, 2013 in counterpart application KR 10-2012-0097292. (7 pages, in Korean)

* cited by examiner

LANE KEEPING CONTROL SYSTEM AND METHOD

CROSS-REFERENCE TO RELATED APPLICATIONS

This application claims priority to and the benefit of Korean Patent Application No. 10-2012-0097292 filed in the Korean Intellectual Property Office on Sep. 3, 2012, the entire contents of which are incorporated herein by reference.

TECHNICAL FIELD

The present invention relates to a lane keeping control system and method, and more particularly, to a lane keeping control system and method which calculates a target trace of a vehicle, in which a variable target distance is reflected, by using information obtained through a camera sensor and a vehicle sensor and controls steering of a vehicle so as to keep a target yaw rate calculated based on the calculated target trace.

BACKGROUND ART

Recently, various types of intelligent robots have been developed. A personal service robot among the intelligent robots means a robot providing a user with services by using a function of a robot in an environment, such as at home or at work. Some service robots, such as a cleaning robot and an educational robot, have been presently released and used, but a meaningful market has not been established yet.

A lane keeping control system is a system configured to sense a lane by using image information obtained from a camera sensor and control a vehicle based on a lane sensing result so as to prevent lane deviation of a vehicle.

The lane keeping control system performs control so as to prevent lane deviation of a vehicle while driving by generating an auxiliary steering torque to a steering control apparatus and controls the steering.

Among the lane keeping control systems, a lane centering control system configured to control lane keeping by controlling steering of a vehicle so as to keep a center of a lane has been developed.

However, the lane keeping control system in the related art sets a reference keeping position which a vehicle has to keep by reflecting a driving tendency of a driver, so that the lane keeping control system is considerably affected by a condition of a lane or a driver. Otherwise, when a vehicle leaves a reference keeping position, the lane keeping control system rapidly performs a control so as to keep a vehicle within the reference keeping position, thereby causing a driver to feel a sense of difference in control of a vehicle.

The lane keeping control system in the related art controls a vehicle by calculating an error in a transverse direction by using a preset target distance, however, the lane keeping control system fails to sensitively respond to a state of a vehicle or compensates for only the error in the transverse direction of a calculated target trace, and thus there is a problem in that a transient response may be generated due to a sharp control input when determining a risk of lane deviation.

SUMMARY OF THE INVENTION

The present invention has been made in an effort to provide a lane keeping control system capable of minimizing a sense of control difference by maintaining consistent control performance even with various driving situations and setting a variable target distance while controlling lane keeping of a vehicle.

The present invention also provides a lane keeping control method capable of minimizing a sense of control difference by maintaining consistent control performance even in various driving situations and setting a variable target distance in controlling lane keeping of a vehicle.

An exemplary embodiment of the present invention provides a lane keeping control system, including: a target distance calculator configured to calculate a target distance by receiving a speed of a vehicle; and a target trace generator configured to generate coordinates of a target point separated by the target distance by receiving vehicle information and camera image information and generate a target trace to the target point as a circular trace.

The lane keeping control system may further include a target yaw rate calculator configured to calculate a target yaw rate based on the vehicle information and the target trace.

The lane keeping control system may further include a target steering angle calculator configured to calculate a target steering angle based on the vehicle information and the target yaw rate.

The lane keeping control system may further include a target steering torque controller configured to calculate a target steering torque based on the vehicle steering angle and the target steering angle.

The target distance may increase as the speed increases, and a minimum value may be set to a predetermined value.

The target distance calculator may determine a time for the vehicle to reach a normal state, a transverse offset error between a center of a lane and the vehicle, and a degree of overshoot by simulating driving of the vehicle while varying the target distance, the speed of the vehicle, and curvature of a lane, and thus set the target distance for each speed.

The target trace generator may calculate the coordinates of the target point by equations, $$y = \frac{\rho_{road}(L^2 - \varepsilon^2)}{2(1 - \rho_{road}\varepsilon)} - \varepsilon \text{ and } x = \sqrt{L^2 - y^2}.$$

Here, y is a transverse distance to the target point, x is a longitudinal distance to the target point, $\rho_{road}$ is curvature of a center of a lane, L is the target distance, and $\varepsilon$ is an offset value from the center of the lane.

The target trace generator may calculate curvature of the target trace for keeping the target point.

The curvature of the target trace for keeping the target point may be calculated by an equation, $$\rho_{des} = \frac{1}{R_{des}} = \frac{2}{L^2}(y\cos\phi - x\sin\phi).$$

Here, $\rho_{des}$ is the curvature of the target trace, $R_{des}$ is a radius of the curvature of the target trace, L is the target distance, $\phi$ is a heading angle of the vehicle with respect to a center of a lane, and x and y are a longitudinal distance and a transverse distance to the target point.

The target yaw rate calculator may calculate the target yaw rate based on curvature of the target trace and the speed of the vehicle by an equation, $$YR_{des} = \rho_{des}V_x.$$

Here, $YR_{des}$ is the target yaw rate, $\rho_{des}$ is the curvature of the target trace, and $V_x$ is the speed of the vehicle.

The target yaw rate calculator may calculate the target yaw rate based on a compensated target curvature obtained by reflecting an error by a side slip generated as the vehicle turns to the curvature of the target trace.

The target steering angle calculator may calculate the target steering angle through feed forward and feedback controls by using the target yaw rate and the yaw rate of the vehicle.

The target steering angle may be calculated based on a compensated target yaw rate calculated by a method of multiplying an error between the target yaw rate and a yaw rate in a normal state by an integral gain and compensating for the error.

The target steering torque controller may calculate the target steering torque through feed forward and feedback controls by using the target steering angle and a steering angle of the vehicle.

Another exemplary embodiment of the present invention provides a lane keeping control method, including: receiving vehicle information and image information from a vehicle sensor and a camera sensor; calculating a target distance by using the vehicle information and the image information; and generating coordinates of a target point separated by the target distance by using the vehicle information and the image information and generating a target trace to the target point as a circular trace.

The lane keeping control method may further include calculating a target yaw rate based on the vehicle information and the target trace after the generating of the target trace.

The lane keeping control method may further include calculating a target steering angle based on the vehicle information and the target yaw rate after the calculating of the target yaw rate.

The lane keeping control method may further include calculating a target steering torque based on a steering angle of the vehicle and the target steering angle after the calculating of the target steering angle.

In the calculating of the target distance, a time for the vehicle to reach a normal state, a transverse offset error between a center of a lane and the vehicle and a degree of overshoot may be determined by simulating a driving of the vehicle while varying the target distance, the speed of the vehicle, and curvature of the lane, and the target distance for each speed may be set according to the determination.

Preferably, the target distance may increase as the speed increases, and a minimum value may be set to a predetermined value.

In the generating of the target trace, the coordinates of the target point may be calculated by equations, $$y = \frac{\rho_{road}(L^2 - \varepsilon^2)}{2(1 - \rho_{road}\varepsilon)} - \varepsilon, \text{ and } x = \sqrt{L^2 - y^2}.$$

Here, y is a transverse distance to the target point, x is a longitudinal distance to the target point, $\rho_{road}$ is curvature of a center of a lane, L is the target distance, and $\varepsilon$ is an offset value from the center of the lane.

In the generating of the target trace, curvature of the target trace for keeping the target point may be calculated.

The curvature of the target trace for keeping the target point may be calculated by an equation, $$\rho_{des} = \frac{1}{R_{des}} = \frac{2}{L^2}(y\cos\phi - x\sin\phi).$$

Here, $\rho_{des}$ is the curvature of the target trace, $R_{des}$ is a radius of the curvature of the target trace, L is the target distance, $\phi$ is a heading angle of the vehicle with respect to a center of a lane, and x and y are a longitudinal distance and a transverse distance to the target point.

In the calculating of the target yaw rate, the target yaw rate may be calculated based on the curvature of the target trace and the speed of the vehicle by an equation, $$YR_{des} = \rho_{des}V_x.$$

Here, $YR_{des}$ is the target yaw rate, $\rho_{des}$ is the curvature of the target trace, and $V_x$ is the speed of the vehicle.

In the calculating of the target yaw rate, the target yaw rate may be calculated based on a compensated target curvature obtained by reflecting an error by a side slip generated as the vehicle turns to the curvature of the target trace.

In the calculating of the target steering angle, the target steering angle may be calculated through feed forward and feedback controls by using the target yaw rate and a yaw rate of the vehicle.

In the calculating of the target steering angle, the target steering angle may be calculated based on a compensated target yaw rate calculated by a method of multiplying an error between the target yaw rate and a yaw rate in a normal state by an integral gain and compensating for the error.

In the calculating of the target steering torque, the target steering torque may be calculated through feed forward and feedback controls by using the target steering angle and a steering angle of the vehicle.

According to the lane keeping control system of the present invention, a target distance is variably calculated according to a speed of a vehicle, and a target trace of the vehicle according to the target distance is generated as a profile (curvature) in a form of a circular trace. By generating an amount of control of the target yaw rate, the target steering angle, and the target steering torque according to the circular trace and applying the generated amount of the control of the target yaw rate, the target steering angle, and the target steering torque to the lane keeping control, smooth lane keeping control may be achieved and a sense of steering difference of a driver may be minimized.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
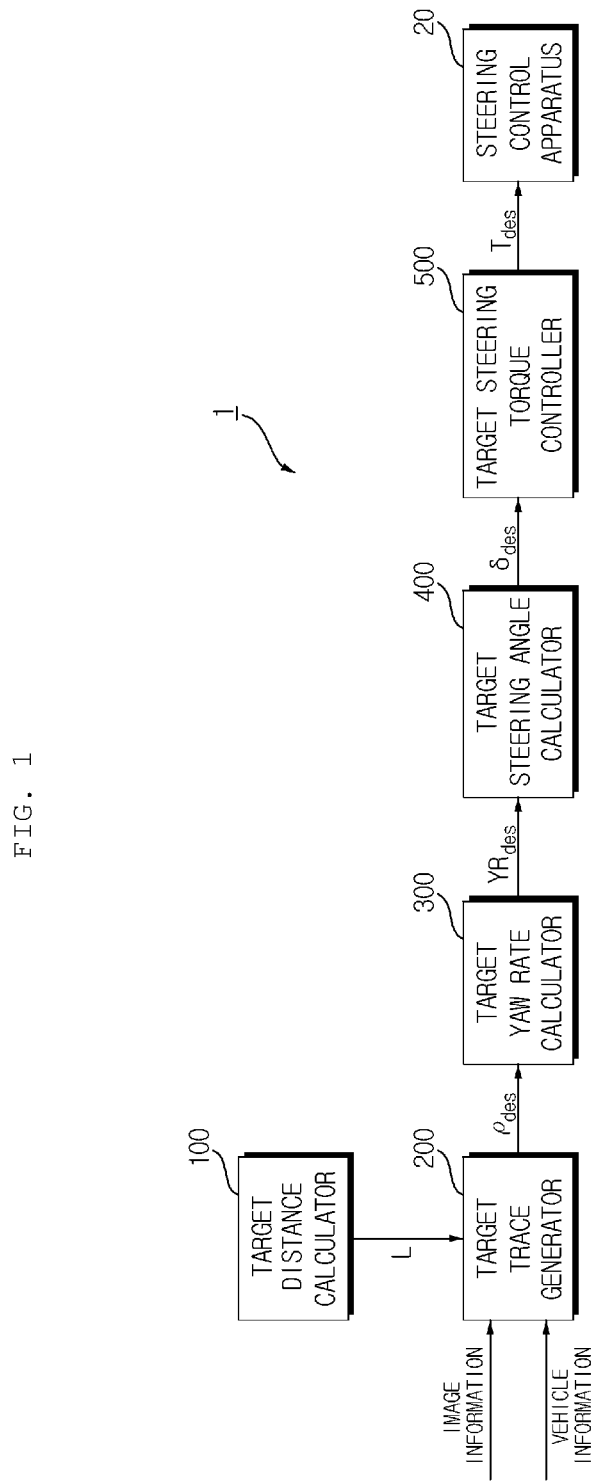
FIG. 1 is a block diagram illustrating a lane keeping control system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

In denoting reference numerals to constitutional elements of respective drawings by reference numerals, it should be noted that the same elements will be designated by the same reference numerals although they are shown in different drawings. An exemplary embodiment of the present invention will be described below, but the technical spirit of the present invention is not limited thereto and may be modified and variously implemented by those skilled in the art.

FIG. 1 is a block diagram illustrating a lane keeping control system according to an exemplary embodiment of the present invention.

Referring to FIG. 1, a lane keeping control system 1 according to an exemplary embodiment of the present invention includes a target distance calculator 100 configured to calculate a target distance by receiving a speed of a vehicle, a target trace generator 200 configured to generate coordinates of a target point separated by the target distance by receiving vehicle information and camera image information and generate a target trace to the target point as a circular trace, a target yaw rate calculator 300 configured to calculate a target yaw rate based on the vehicle information and the target trace, a target steering angle calculator 400 configured to calculate a target steering angle based on the vehicle information and the target yaw rate, and a target steering torque controller 500 configured to calculate a target steering torque based on the vehicle steering angle and the target steering angle.

The target distance calculator 100 variably calculates a target distance according to a speed of the vehicle. As the speed of the vehicle increases, the target distance increases and a minimum value is set to a predetermined value.

More particularly, first, the target distance calculator 100 simulates a driving of the vehicle while varying the target distance, the speed of the vehicle, and curvature of a lane. In the present exemplary embodiment, a time for the vehicle to reach a normal state by the simulation, a transverse offset error between a center of the lane and the vehicle and a degree of overshoot, and the like are determined, a target distance for each speed is set according to the determination, and then the set target distance is approximated as a linear equation. The target distance calculator 100 of the present exemplary embodiment may calculate a target distance varying according to a speed by using the calculated linear equation. In this case, the set target distance increases as a speed of the vehicle increase, and a minimum value has been set to a predetermined value.

The target distance calculated according to the speed is multiplied by a gain varying according to curvature, so that a final target distance is determined. Since more rapid control input needs to be performed on a straight lane compared to a curved lane, an influence of a lane curvature is also considered.

Figure 2:
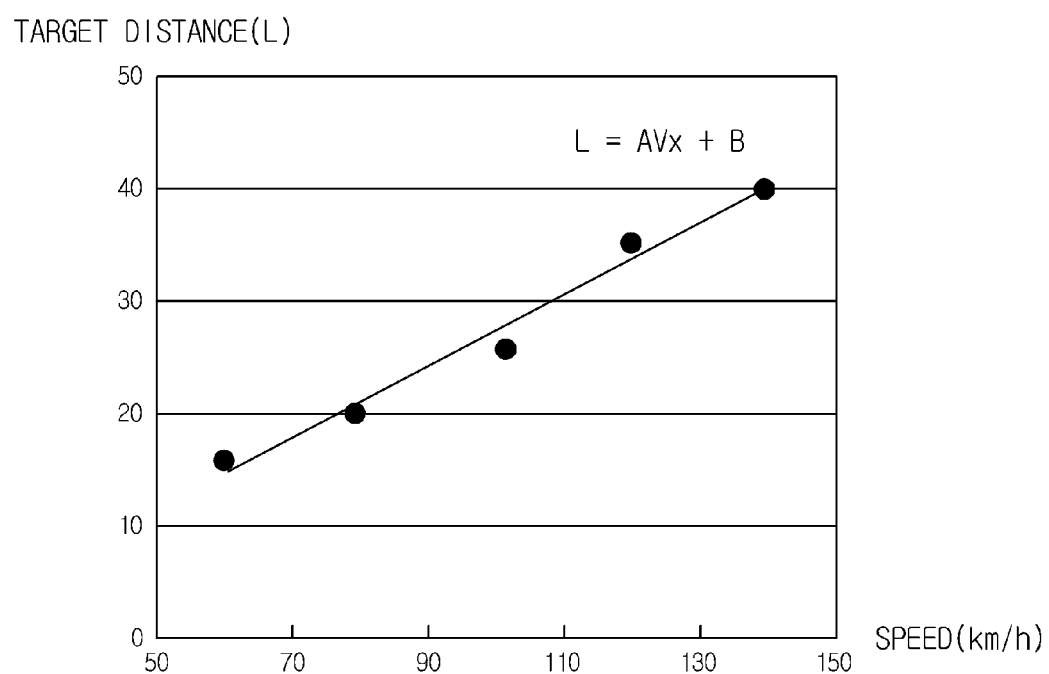
FIG. 2 is a graph for calculating a target distance by a target distance calculator of FIG. 1.

FIG. 2 is a graph illustrating a target distance for each speed of the vehicle calculated as a result of the simulation by the target distance calculator 100.

Referring to FIG. 2, the variably calculated target distance in the present exemplary embodiment may be represented by an equation below.

$$L = A \cdot V_x + B (L \geq L_{min}) \quad \text{[Equation 1]}$$

Here, L is a target distance, $L_{min}$ is a minimum value, $V_x$ is a speed of the vehicle, and A and B are constants representing a straight inclination and an intercept value generated from a result value of the simulation. In the present exemplary embodiment, the minimum value ($L_{min}$) of the target distance is set to 10 m, so as to prevent the target distance from excessively decreasing at a low speed.

However, the scope of the present invention is not limited thereto, and the variable change of the target distance according to the speed of the vehicle so as to achieve the stable performance of the lane keeping control may be variously modified and worked.

The target trace generator 200 generates coordinates of a target point according to the target distance calculated by the target distance calculator 100 and generates the target trace in a form of a circular trace.

Figure 3:
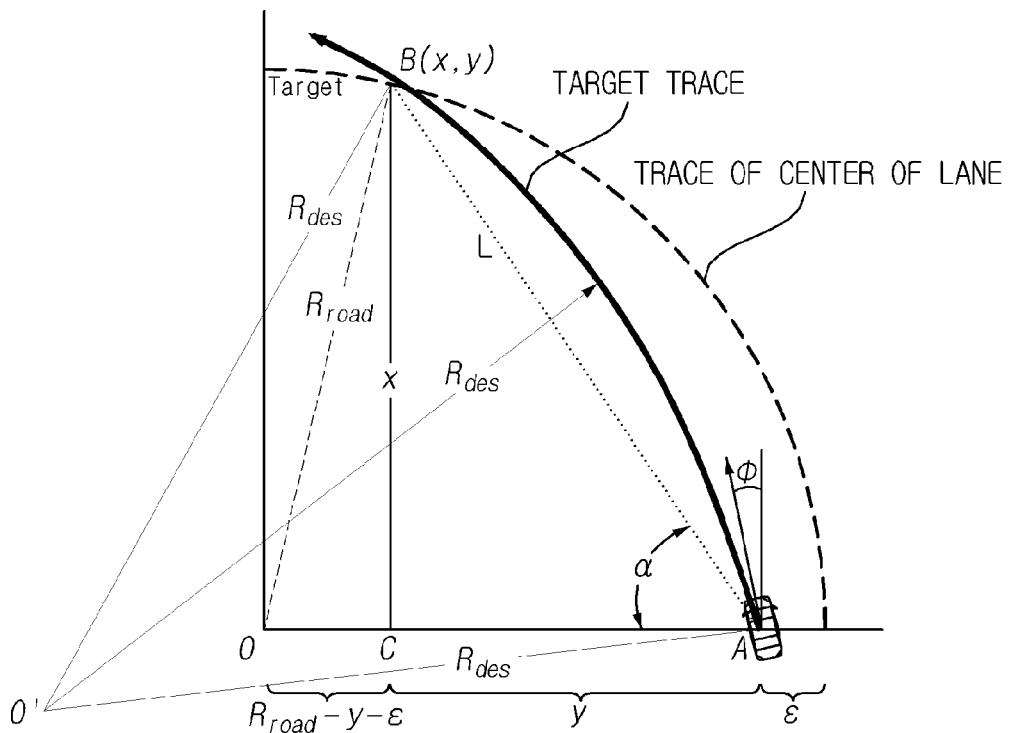
FIG. 3 is a diagram illustrating a target trace calculated by a target trace generator of FIG. 1.

FIG. 3 is a diagram illustrating the target trace calculated by the target trace generator 200.

Referring to FIG. 3, the target trace generator 200 generates a trace helping the vehicle to follow a virtual line generated according to a certain offset ϵ designated at a center of the lane by using the target distance L that is variably changed according to the speed $V_x$ of the vehicle and calculated by the target distance calculator 100. Here, when the offset ϵ is 0, the trace for the vehicle to follow the center of the lane is generated.

When a lane center point B separated by the target distance L from a current position A of the vehicle is referred to as a target point, the target trace generator 200 may calculate the position A of the vehicle, a heading angle ϕ of the vehicle, and the target distance L by using the image information obtained from the camera sensor and the vehicle information obtained from the vehicle sensor, and represent the trace for reaching a target point B on a lane in a circular profile in real time.

Coordinates B(x, y) of the target point B may be calculated by using Pythagorean theorem as follows. Here, x is a longitudinal distance of the vehicle to the target point, and y is a transverse distance of the vehicle to the target point.

$$R_{road}^2 = (R_{road} - y - \epsilon)^2 + x^2, \quad x = \sqrt{L^2 - y^2} \quad \text{[Equation 2]}$$

The transverse distance to the target point calculated with the two equations may be represented as follows.

$$y = \frac{L^2 - \varepsilon^2 - 2\varepsilon(R_{road} - \varepsilon)}{2(R_{road} - \varepsilon)} = \frac{\rho_{road}(L^2 - \varepsilon^2)}{2(1 - \rho_{road}\varepsilon)} - \varepsilon, \quad \text{[Equation 3]}$$

$$\text{where, } \rho_{road} = \frac{1}{R_{road}}$$

Here, $\phi$ represents a heading angle of the vehicle with respect to the center of the lane, $\varepsilon$ represents an offset distance of the vehicle from the center of the lane, $R_{road}$ represents a radius of curvature of the center of the lane, L represents the target distance, and $\rho_{road}$ represents the curvature of the center of the lane.

The longitudinal distance to the target point may be calculated with the second equation of Equation 2.

When the coordinates B(x,y) of the target point in the target trace are calculated, the target trace generator 200 calculates curvature of the target trace for keeping the target point.

The curvature of the target trace may be calculated as follows.

$$R_{des}\cos(\phi + \alpha) = \frac{R_{des}}{L}(y\cos\phi - x\sin\phi) = \frac{L}{2} \quad \text{[Equation 4]}$$

$$\rho_{des} = \frac{1}{R_{des}} = \frac{2}{L^2}(y\cos\phi - x\sin\phi),$$

$$(x = L\sin\alpha, \, y = L\cos\alpha)$$

Here, $\phi$ represents a heading angle of the vehicle with respect to the center of the lane, $\alpha$ represents an angle between the vehicle and the target point, $R_{des}$ represents a radius of curvature of the target trace, $\rho_{des}$ represents curvature of the target trace, and L represents the target distance.

Figure 4:
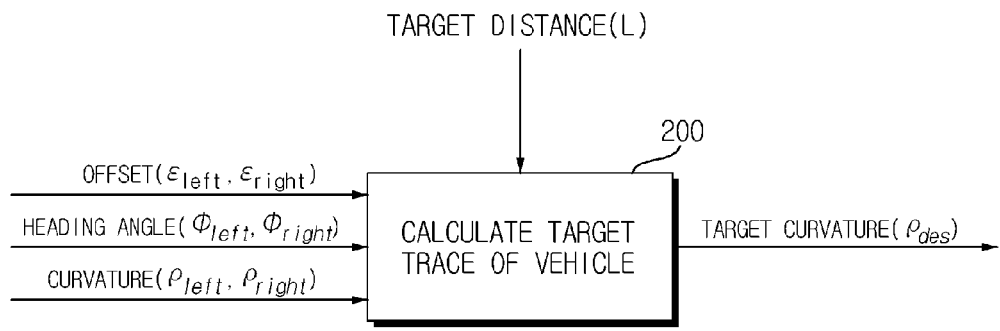
FIG. 4 is a diagram schematically illustrating input and output of the target trace generator of FIG. 1.

FIG. 4 is a diagram schematically illustrating input and output of the target trace generator 200.

As illustrated with reference to FIG. 4, the target trace generator 200 receives the offset value $\varepsilon$, the heading angle $\phi$, and the curvature $\rho_{road}$ of the center of the lane from the image information of the camera sensor, and receives the target distance L calculated by the target distance calculator 100 to generate the target trace of the vehicle and outputs a value of the curvature $\rho_{des}$ of the target trace.

More particularly, the target trace generator 200 may obtain values of offsets $\varepsilon_{left}$ and $\varepsilon_{right}$, heading angles $\phi_{left}$ and $\phi_{right}$, and curvatures $\rho_{left}$ and $\rho_{right}$ of the vehicle for a left lane and a right lane of the vehicle from the image information of the camera sensor.

Then, the target trace generator 200 may obtain the offset value $\varepsilon$, the heading angle $\phi$, and a value of the curvature $\rho_{road}$ of the center of the lane for the center of the lane from the obtained values by equations, $$\phi = \frac{\phi_{left} + \phi_{right}}{2}, \, \varepsilon = \frac{\varepsilon_{left} + \varepsilon_{right}}{2}, \, \rho_{road} = \frac{2\rho_{left}\rho_{right}}{\rho_{left} + \rho_{right}}.$$

Figure 5:
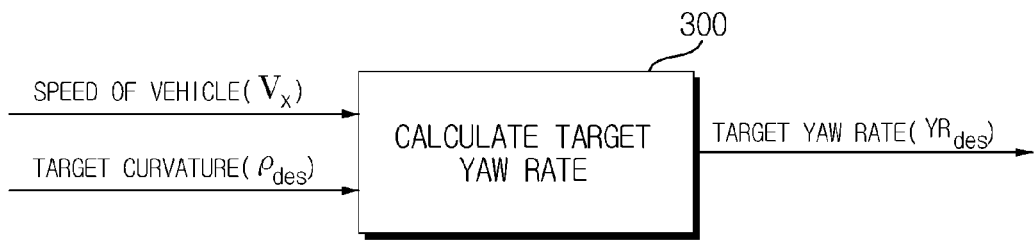
FIG. 5 is a diagram schematically illustrating input and output of a target yaw rate calculator of FIG. 1.

FIG. 5 is a diagram schematically illustrating input and output of the target yaw rate calculator 300 of FIG. 1.

Referring to FIG. 5, the target yaw rate calculator 300 calculates a target yaw rate $YR_{des}$ from the curvature $\rho_{des}$ of the target trace calculated by the target trace generator 200 and the speed $V_x$ of the vehicle. An equation for calculating the target yaw rate is as follows.

$$YR_{des} = \rho_{des}V_x \quad \text{[Equation 5]}$$

Here, $YR_{des}$ represents the target yaw rate, $\rho_{des}$ represents the curvature of the target trace, and $V_x$ represents the speed of the vehicle.

In the meantime, in the present exemplary embodiment, the target yaw rate calculator 300 reflects an error due to a side slip generated as the vehicle turns to the curvature of the target trace. Curvature in which the error due to a side slip generated as the vehicle turns is compensated is referred to as a compensated target curvature, and the target yaw rate calculator 300 calculates the target yaw rate by using the compensated target curvature. The error due to the side slip is calculated considering the curvature, the speed, the target distance, and the like.

Figure 6:
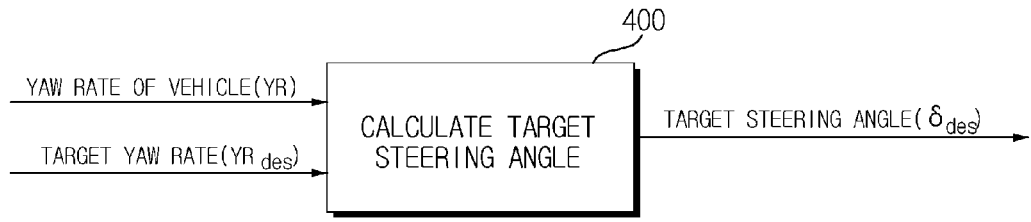
FIG. 6 is a diagram schematically illustrating input and output of a target steering angle calculator of FIG. 1.
Figure 7:
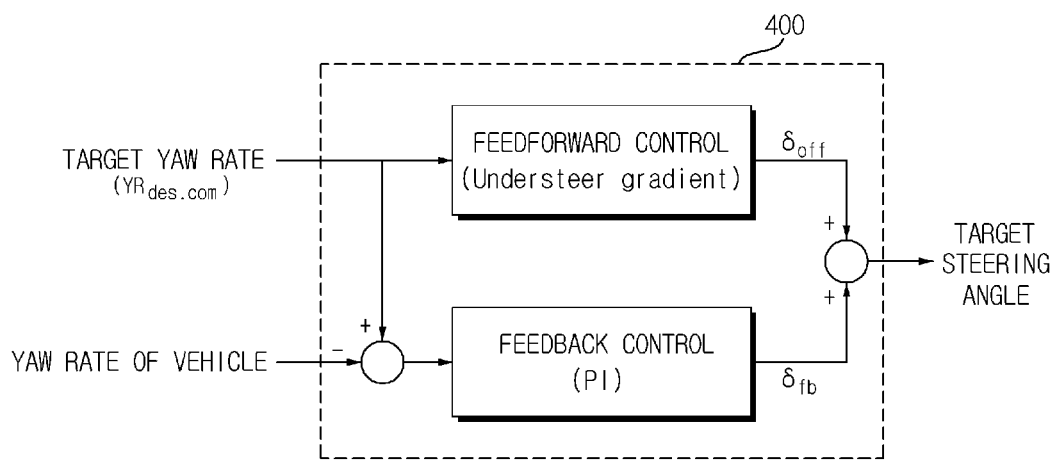
FIG. 7 is a diagram schematically illustrating a process of performing feedforward and feedback controls by the target steering angle calculator of FIG. 1.

FIG. 6 is a diagram schematically illustrating input and output of the target steering angle calculator 400, and FIG. 7 is a diagram schematically illustrating a process of performing feedforward and feedback controls by the target steering angle calculator 400.

Referring to FIG. 6, the target steering angle calculator 400 calculates a target steering angle $\delta_{des}$ by using the target yaw rate $YR_{des}$ calculated by the target yaw rate calculator 300 and a yaw rate YR of the vehicle obtained from the vehicle sensor. Particularly, the target steering angle calculator 400 calculates the target steering angle through feedforward and feedback controls by using the target yaw rate and the yaw rate of the vehicle as illustrated in FIG. 7.

In this case, a value compensated through the comparison with a yaw rate in a state where the vehicle normally drives is used for the target yaw rate used in the target steering angle calculator 400. The reason is that it makes the vehicle accurately keep the target point B by comparing the target yaw rate calculated by the target yaw rate calculator 300 when the vehicle drives a curved road with the yaw rate in a state where the vehicle is normally driven and compensating for the error of the target yaw rate.

A compensated target yaw rate $YR_{des,com}$ is calculated by a method of multiplying the error between the target yaw rate calculated by the target yaw rate calculator 300 and the yaw rate in the normal state by an integral gain and compensating for the error.

Figure 8:
FIG. 8 is a diagram schematically illustrating input and output of a target steering torque controller of FIG. 1.

FIG. 8 is a diagram schematically illustrating input and output of the target steering torque controller 500 of FIG. 1.

Referring to FIG. 8, the target steering torque controller 500 calculates a target steering torque by receiving the target steering angle from the target steering angle calculator 400 and the steering angle of the vehicle from the vehicle sensor.

The target steering torque controller 500 of the present exemplary embodiment calculates the target steering torque through the feed forward and feedback controls by using the target steering angle and the steering angle of the vehicle similar to the target steering angle calculator 400.

An operation of the lane keeping control system 1 having the aforementioned configuration will be described.

When a driver operates the lane keeping control system 1 while driving, the image information (the offset, the heading angle, the curvature of the lane, and the like) and the vehicle information (the speed, the yaw rate, and the steering angle of the vehicle, and the like) are input to the lane keeping control system 1 from the camera sensor and the vehicle sensor.

The target distance calculator 100 variably calculates a target distance from the speed of the vehicle. The target trace generator 200 generates a target trace as a circular trace through the calculated target distance and the image information.

The target trace generator 200 transmits curvature according to the generated target trace to the target yaw rate calculator 300, and the target yaw rate calculator 300 calculates a target yaw rate by using the curvature of the target trace and the speed of the vehicle.

The calculated target yaw rate is input to the target steering angle calculator 400, and the target steering angle calculator 400 calculates a target steering angle through feedforward and feedback controls by using the target yaw rate and the yaw rate of the vehicle.

The calculated target steering angle is input to the target steering torque controller 500, and the target steering torque controller 500 calculates a target steering torque through feedforward and feedback controls by using the target steering angle and the steering angle of the vehicle.

The calculated target steering torque is input to a steering control apparatus 20, and the steering control apparatus 20 controls steering of the vehicle according to a value of the target steering torque. Accordingly, the vehicle is controlled so as to keep the target point B along the virtual target trace.

In the lane keeping control system 1 of the present invention, the target distance varies according to the speed of the vehicle, and the target point of the vehicle is determined according to the target distance and the image information. Accordingly, the target trace is calculated in real time. Since the target yaw rate, the target steering angle, and the target steering torque are calculated from the target trace, the target steering torque is set in real time, so that the steering of the vehicle is controlled. Accordingly, the present invention can perform the consistent lane keeping control even in various driving environments and minimize a sense of difference in executing the lane keeping control.

In the meantime, a lane keeping control method according to an exemplary embodiment of the present invention will be described below with reference to the accompanying drawings. However, descriptions of the same matters as those described in the lane keeping control system 1 according to the exemplary embodiment of the present invention will be omitted.

Figure 9:
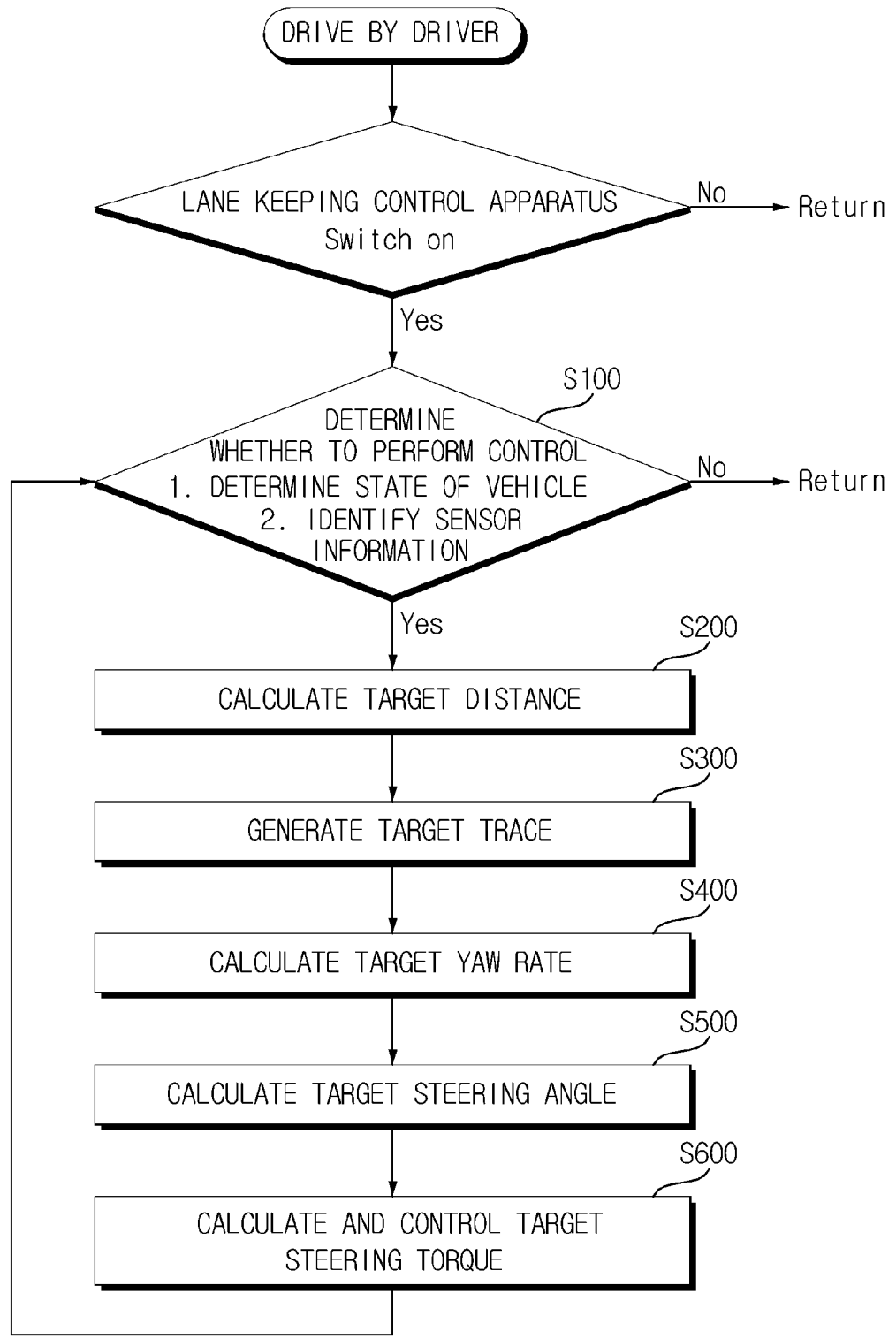
FIG. 9 is a flowchart illustrating a lane keeping control method according to an exemplary embodiment of the present invention.

FIG. 9 is a flowchart illustrating a lane keeping control method according to an exemplary embodiment of the present invention.

Referring to FIG. 9, the lane keeping control method according to an exemplary embodiment of the present invention includes receiving vehicle information and image information from a vehicle sensor and a camera sensor (S100), calculating a target distance by using the vehicle information and the image information (S200), generating coordinates of a target point separated by the target distance by using the vehicle information and the image information and generating a target trace to the target point as a circular trace (S300), calculating a target yaw rate based on the vehicle information and the target trace (S400), calculating a target steering angle based on the vehicle information and the target yaw rate (S500), and calculating a target steering torque based on a steering angle of the vehicle and the target steering angle (S600).

In the calculating of the target distance (S200), a radius of the circle having a predetermined lateral acceleration value in the speed of the vehicle is calculated, simulation according to the calculated radius of the circle, the speed of the vehicle, and the target distance is performed, and the target distance varying according to the speed is generated considering a settling time and an error so that the vehicle may be operated in a normal state. This is the same as the method of the calculation performed by the target distance calculator 100 of the lane keeping control system 1 according to the exemplary embodiment of the present invention, so the description will be omitted.

In the generating of the target trace (S300), the curvature of the target trace for keeping the target point is calculated. A process of calculating the curvature of the target trace for keeping the target point is the same as the method of the calculation performed by the target trace generator 200 of the lane keeping control system 1 according to the exemplary embodiment of the present invention, so the detailed description will be omitted.

The calculating of the target yaw rate (S400) is the same as the method of the calculation performed by the target yaw rate calculator 300 of the lane keeping control system 1 according to the exemplary embodiment of the present invention, so the detailed description will be omitted.

The calculating of the target steering angle (S500) is the same as the method of the calculation performed by the target steering angle calculator 400 of the lane keeping control system 1 according to the exemplary embodiment of the present invention, so the detailed description will be omitted.

The calculating of the target steering torque (S600) is the same as the method of the calculation performed by the target steering torque controller 500 of the lane keeping control system 1 according to the exemplary embodiment of the present invention, so the detailed description will be omitted.

An action of the lane keeping control method having the aforementioned configuration will be described below. When a driver operates the lane keeping control system 1 while driving, the lane keeping control system 1 receives the image information (the offset, the heading angle, the curvature of the lane, and the like) and the vehicle information (the speed, the yaw rate, and the steering angle of the vehicle, and the like) from the camera sensor and the vehicle sensor (S100).

The target distance is variably calculated from the input speed of the vehicle. The target trace is generated as a circular trace through the calculated target distance and the image information.

The curvature is calculated according to the generated target trace, and the target yaw rate is calculated by using the curvature of the target trace and the speed of the vehicle.

Next, the target steering angle is calculated through feedforward and feedback controls by using the calculated target yaw rate and the yaw rate of the vehicle.

The target steering torque is calculated through feedforward and feedback controls by using the calculated target steering angle and the steering angle of the vehicle.

The calculated target steering torque is input to the steering control apparatus 20, and the steering control apparatus 20 controls steering of the vehicle according to a value of the target steering torque. Accordingly, the vehicle is controlled so as to keep the target point B along the virtual target trace.

As described above, according to the lane keeping control method of the present invention, the target distance is variably calculated according to the speed of the vehicle, and the target trace of the vehicle according to the target distance is generated as a profile (curvature) in a form of a circular trace. By generating an amount of control of the target yaw rate, the target steering angle, and the target steering torque according to the circular trace and applying the generated amount of the control of the target yaw rate, the target steering angle, and the target steering torque to the lane keeping control, smooth lane keeping control may be achieved and a sense of steering difference of a driver may be minimized.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A lane keeping control system, comprising:
 a processor that comprises:
  a target distance calculator configured to calculate, based on a speed of a vehicle, a target distance relative to a position of the vehicle;
  a target trace generator configured to:
   generate, based on the target distance, coordinates of a target point of the vehicle,
    wherein the target distance is a distance between the position of the vehicle and the target point, and
   generate a target trace from the position of the vehicle to the target point as a circular trace;
  a target yaw rate calculator configured to calculate a target yaw rate based on vehicle information received from a vehicle sensor and the target trace; and
 a steering control apparatus configured to control steering of the vehicle according to the calculated target yaw rate,
 wherein the target trace generator is configured to calculate the coordinates of the target point by equations, $$y = \frac{\rho_{road}(L^2 - \varepsilon^2)}{2(1 - \rho_{road}\varepsilon)} - \varepsilon \text{ and } x = \sqrt{L^2 - y^2},$$

where y is the transverse distance to the target point, x is the longitudinal distance to the target point, $\rho_{road}$ is a curvature of a center of a lane, L is the target distance, and $\varepsilon$ is an offset value from the center of the lane, and
 wherein the curvature of the target trace for keeping the target point is calculated by an equation, $$\rho_{des} = \frac{1}{R_{des}} = \frac{2}{L^2}(y\cos\phi - x\sin\phi),$$

where $\rho_{des}$ is the curvature of the target trace, $R_{des}$ is a radius of the curvature of the target trace, L is the target distance, $\phi$ is a heading angle of the vehicle with respect to a center of a lane, and x and y are the longitudinal distance and the transverse distance to the target point.

2. The lane keeping control system of claim 1, further comprising:
 a target steering angle calculator configured to calculate a target steering angle based on the vehicle information and the target yaw rate.

3. The lane keeping control system of claim 2, further comprising:
 a target steering torque controller configured to calculate a target steering torque based on the vehicle steering angle and the target steering angle.

4. The lane keeping control system of claim 3, wherein the target steering torque controller is configured to calculate the target steering torque through feed forward and feedback controls based on the target steering angle and a steering angle of the vehicle.

5. The lane keeping control system of claim 2, wherein the target steering angle calculator is configured to calculate the target steering angle through feed forward and feedback controls based on the target yaw rate and the yaw rate of the vehicle.

6. The lane keeping control system of claim 1, wherein the target distance calculator is configured to:
 determine a time for reaching of the vehicle to a normal state, a transverse offset error between a center of a lane and the vehicle, and a degree of overshoot by simulating a driving of the vehicle while varying the target distance, the speed of the vehicle, and curvature of a lane; and
 set the target distance for each speed according to the determination.

7. The lane keeping control system of claim 1, wherein the target yaw rate calculator is configured to calculate the target yaw rate based on the curvature of the target trace and the speed of the vehicle by an equation, $$YR_{des} = \rho_{des}V_x,$$

where $YR_{des}$ is the target yaw rate, $\rho_{des}$ is the curvature of the target trace, and $V_x$ is the speed of the vehicle.

8. A lane keeping control method performed by a controller comprising a processor, the method comprising:
 receiving vehicle information and image information from a vehicle sensor and a camera sensor;
 calculating, based on a speed of a vehicle, a target distance relative to a position of the vehicle based on the vehicle information and the image information;
 generating, based on the target distance, coordinates of a target point of the vehicle, wherein the target distance is a distance between the position of the vehicle and the target point, and
 generating a target trace from the position of the vehicle to the target point as a circular trace;
 calculating a target yaw rate based on the vehicle information and the target trace after the generating of the target trace, and
 controlling steering of the vehicle according to the calculated target yaw rate,
 wherein in the generating of the target trace, the coordinates of the target point are calculated by equations, $$y = \frac{\rho_{road}(L^2 - \varepsilon^2)}{2(1 - \rho_{road}\varepsilon)} - \varepsilon \text{ and } x = \sqrt{L^2 - y^2},$$

where y is the transverse distance to the target point, x is the longitudinal distance to the target point, $\rho_{road}$ is a curvature of a center of a lane, L is the target distance, and $\epsilon$ is an offset value from the center of the lane, and wherein the curvature of the target trace for keeping the target point is calculated by an equation, $$\rho_{des} = \frac{1}{R_{des}} = \frac{2}{L^2}(y\cos\phi - x\sin\phi),$$

where $\rho_{des}$ is the curvature of the target trace, $R_{des}$ is a radius of the curvature of the target trace, L is the target distance, $\phi$ is a heading angle of the vehicle with respect to a center of a lane, and x and y are the longitudinal distance and the transverse distance to the target point.

9. The lane keeping control method of claim 8, further comprising:
calculating a target steering angle based on the vehicle information and the target yaw rate after the calculating of the target yaw rate.

10. The lane keeping control method of claim 9, further comprising:
calculating a target steering torque based on a steering angle of the vehicle and the target steering angle after the calculating of the target steering angle.

11. The lane keeping control method of claim 10, wherein in the calculating of the target steering torque, the target steering torque is calculated through feed forward and feedback controls based on the target steering angle and a steering angle of the vehicle.

12. The lane keeping control method of claim 9, wherein in the calculating of the target steering angle, the target steering angle is calculated through feed forward and feedback controls based on the target yaw rate and a yaw rate of the vehicle.

13. The lane keeping control method of claim 8, wherein in the calculating of the target distance, a time for reaching of the vehicle to a normal state, a transverse offset error between a center of a lane and the vehicle and a degree of overshoot are determined by simulating a driving of the vehicle while varying the target distance, the speed of the vehicle, and curvature of the lane, and the target distance for each speed is set according to the determination.

14. The lane keeping control method of claim 8, wherein in the calculating of the target yaw rate, the target yaw rate is calculated based on the curvature of the target trace and the speed of the vehicle by an equation, $$YR_{des} = \rho_{des}V_x,$$

where $YR_{des}$ is the target yaw rate, $\rho_{des}$ is the curvature of the target trace, and $V_x$ is the speed of the vehicle.

* * * * *